United States Patent
Singh et al.

(10) Patent No.: US 8,900,670 B2
(45) Date of Patent: Dec. 2, 2014

(54) ANTI-CORROSIVE HYBRID SOL-GEL FILM ON METALLIC SUBSTRATES AND METHOD OF PRODUCING THE SAME

(75) Inventors: Arun Kumar Singh, Jamshedpur (IN); Tapan K. Rout, Jamshedpur (IN); Ramanuj Narayan, Jamshedpur (IN); Anil K. Verma, Jamshedpur (IN); Nikhiles Bandyopadhyay, Jamshedpur (IN); Nitu Rani, Jamshedpur (IN)

(73) Assignee: Tata Steel Limited, Jamshedpur (IN)

( * ) Notice: Subject to any disclaimer, the term of this patent is extended or adjusted under 35 U.S.C. 154(b) by 803 days.

(21) Appl. No.: 12/594,309

(22) PCT Filed: May 23, 2008

(86) PCT No.: PCT/IN2008/000327
§ 371 (c)(1),
(2), (4) Date: Jan. 6, 2011

(87) PCT Pub. No.: WO2009/141830
PCT Pub. Date: Nov. 26, 2009

(65) Prior Publication Data
US 2011/0091654 A1    Apr. 21, 2011

(51) Int. Cl.
*B05D 3/02* (2006.01)
*C09D 1/02* (2006.01)
*C23C 18/12* (2006.01)
*C23F 11/18* (2006.01)
*C23C 22/53* (2006.01)
*C09D 7/12* (2006.01)
*C23C 22/74* (2006.01)
*C09D 5/08* (2006.01)
*C08K 5/057* (2006.01)
*C08K 3/18* (2006.01)

(52) U.S. Cl.
CPC . *C23C 22/53* (2013.01); *C09D 1/02* (2013.01); *C23C 18/1241* (2013.01); *C08K 5/057* (2013.01); *C23F 11/185* (2013.01); *C23C 18/1216* (2013.01); *C23C 18/122* (2013.01); *C23C 2222/20* (2013.01); *C08K 3/18* (2013.01); *C09D 7/1216* (2013.01); *C23C 22/74* (2013.01); *C23C 18/127* (2013.01); *C23C 18/1254* (2013.01); *C09D 5/084* (2013.01); *C09D 7/1233* (2013.01); *C23C 18/1212* (2013.01)
USPC ...................................... 427/388.1

(58) Field of Classification Search
CPC .............. C23C 11/185; C23C 18/1216; C23C 18/1212; C23C 22/53; C23C 22/74; C23C 18/122; C23C 18/1254; C23C 18/1241; C23C 18/127; C09D 5/084; C09D 7/1216; C09D 1/02; C09D 7/1233; C08K 3/18; C08K 2222/20; C08K 5/057
USPC ...................................... 427/388.1
See application file for complete search history.

(56) References Cited

U.S. PATENT DOCUMENTS 6,162,498 A    12/2000    Mennig et al.
6,579,472 B2    6/2003    Chung et al.

FOREIGN PATENT DOCUMENTS

EP    1 338 678 A2    8/2003
GB    464101 A       4/1937
JP    09-095796 A    4/1997

*Primary Examiner* — Robert S Walters, Jr.
(74) *Attorney, Agent, or Firm* — Venable LLP; Jeffri A. Kaminski

(57) ABSTRACT

This invention relates to a method of preparing anti-corrosive hybrid sol-gel film coating on zinc or zinc alloy coated metallic substrates comprising the steps of preparing a mixture of sol-gel from hydrolisable silicon alkoxides, sodium venadate solution combined with colloidal silica in a beaker and vigorously stirred; adding within 20 seconds of two separated phase formation between silica precursors and colloidal silica acetic acid or dilute nitric acid as a catalizer to initiate hydrolysis reaction of silicon alkoxides and condensation reaction in the sol gel composition, continuously stirring the mixture for about 24 hours to form a single phase solution, applying the solution on cleaned zinc or zinc alloy coated metal substrates to form a transparent sol-gel coating film and drying the coated substrates at 50° to 200° C. for 10 to 60 minutes.

8 Claims, No Drawings

ANTI-CORROSIVE HYBRID SOL-GEL FILM ON METALLIC SUBSTRATES AND METHOD OF PRODUCING THE SAME

FIELD OF THE INVENTION

The present invention relates to the development of sol-gel coating on metal surface especially zinc alloys coated steel substrate, which provide a durable, corrosion resistant, hydrophobic coating.

BACKGROUND OF THE INVENTION

The zinc and zinc alloy coatings are highly susceptible to corrosion and therefore chromate passivation is usually applied directly after galvanizing in line to enhance the corrosion protection properties of zinc and zinc alloy. This method is widely applied as an effective and economical method of corrosion prevention. However, chromate conversion coating contains hexavalent chromium which is carcinogenic and they are environmentally and toxicologically hazardous. Therefore, alternative coating development for protecting zinc and zinc alloys is a growing need of industries.

In recent trend, thin organic protective coating formulation by sol-gel process has found a most suitable alternative to chromate passivation. In sol-gel method, small molecules can be converted into polymeric or ceramic materials depending upon the monomers selection. Silance sol-gel chemistry consists primarily of hydrolysis and condensation reactions of alkoxysilane precursors that form macro- or nanoporous gel as the reaction proceed. The hydrolysis reaction are typically catalyzed by base or acid conditions, producing partly or completely hydrolyzed silanol and then condensation reaction occur to form siloxane bridge resulting in a polymerization to form molecules of a glass-like oxide or ceramic network.

U.S. Pat. No. 6,162,498, has described a sol-gel coating formulation consisted of precursors methyltriethoxy silane, tetraethoxy silane, silica sol and then it was catalysed by orthophosphoric acid addition. This coating gives colourless coating formulation on cleaned substrate. However, this sol-gel formulation required filtration prior to application on substrate. Furthermore, after coating formulation it started to become viscous and then became gel very fast. Similarly the. U.S. Pat. No. 6,579,472 has described the uses of triethylphosphate as a preferable corrosion inhibitor but it was also not found suitable for zinc and zinc alloy steel substate.

The present invention is aimed to develop a sol-gel coating formulations on removing the above difficulties of prior art.

The present invention describes a sol-gel coating formulations which after application on zinc and zinc alloy coated substrate enhances the corrosion resistance properties of the substrate. The coating performance of the sol-gel formulation is further enhanced by addition of inorganic compound, particularly sodium metavanadate. The sol-gel coatings enhance the corrosion resistance as well as give a hydrophobic surface characteristic on metal surface.

DESCRIPTION OF THE INVENTION

One objective of the invention is to develop an hybrid anti-corrosive sol-gel coating to be applied in the zinc and zinc alloy substrates by preparing a synergestic solution consisted of silicon alkoxides along with colloidal silica and sodium metavenadate.

According to another objective of the invention zinc and zinc alloy substrate samples are prepared on which the novel coating formulation is applied.

An yet another objective of the invention is to prepare a sodium venadate solution separately to be added to sol-gel formulation to enhance the corrosion resistance properties of sol-gel formulations.

A still another objective of the invention is to add acetic acid or dilute nitric acid used as a catalyzer to initiate hydrolysis reaction of sol-gel solution.

The proposed invention relates to development of an anti-corrosive sol-gel formulation consisted of silicon alkoxides particularly Trimethoxymethylsilane, Tetraethyl orthosilicate ethyltriethoxysilane, methyltriethoxysilane and Tetramethoxysilane, along with colloidal silica and sodium metavenadate. The colloidal silica used in this formulation provides $SiO_2$ particles of average particle size less than 30 µm. The sodium metavenadate used in the formulation is first made soluble in water and then added in required quantity in the sol-gel formulation. The acetic acid or dilute nitric acid is used as an acid catalyser to initiate hydrolysis reaction. Colloidal silica used in preparing the anticorrosive composition has a nano particle silica sol of surface area 200-300 meter square per gram and PH in the range of 8.5-10.

According to the invention there is provided a method of preparing anti-corrosive hybrid sol-gel film coating on zinc or zinc alloy coated metallic substrates comprising the steps of preparing a mixture of sol-gel from hydrolisable silicon alkoxides, sodium venadate solution combined with colloidal silica in a beaker and vigorously stirred; adding within 20 seconds of two separated phase formation between silica precursors and colloidal silica acetic acid or dilute nitric acid as a catalizer to initiate hydrolysis reaction of silicon alkoxides and condensation reaction in the sol gel composition, continuously stirring the mixture for about 24 hours to form a single phase solution, applying the solution on cleaned zinc or zinc alloy coated metal substrates to form a transparent sol-gel coating film and drying the coated substrates at 50° to 200° C. for 10 to 60 minutes.

Sample Preparation: The zinc and zinc alloy substrate commercially known as galvanized and galvannealed materials respectively were used in the present investigation. The galvanized material is a pure zinc coating where as the galvannealed material is a zinc-iron alloy containing about 10% iron in coating formulation. The material was first alkali cleaned followed by washing under tap water then further washed in demineralized water and dried. The substrate may be further cleaned optionally by ultrasonically in an organic solvent such as isopropanol.

Sodium vanadate solution preparation: 1.5. gm of sodium venadate compound was added in 10 ml of distilled water. Sodium vanadate is insoluble in water and therefore 1 drop of nitric acid was added under vigorous stirring condition. The above solution was heated upto 50° C. and kept under continuous stirring till the sodium vanadate is completely dissolved in water. A light yellow colour solution of sodium venadate was observed which is kept in a glass container at ambient temperature. This sodium venadate solution was added in appropriate amount in sol-gel formulation to enhance the corrosion resistance properties of sol-gel formulation to enhance the corrosion resistance properties of sol-gel formulation.

The proposed invention relating to preparations of sol-gel coating formulation is illustrated in the following examples.

EXAMPLE 1

A mixture of 30 ml of Trimethoxymethylsilane (TMMS) and 8 ml of Tetraethyl orthosilicate (TEOS) combined in a beaker and with vigorous stirring 23 g of colloidal silica (sigma. Aldrich product, ludox AM 30 colloidal silica 30 wt % suspension in water) was added. Initially, two phase separation was observed between silica precursors and colloidal silica. Within 20 second of the colloidal silica addition, 0.3 to 0.5 ml of acetic acid was added in the formulation. The above solution was kept under stirring condition for about 24 hours and in this time period the two phases disappear to become a single phase sol formulation. This sol formulation was applied by dip coating process on zinc or zinc alloy coated steel substrate. This gave a clear transparent sol-gel coating film. The coated substrate was then dried in oven at 60 to 200° C. for 20 to 30 minutes.

If required in the above sol formulation, viscosity may be reduced by adding ehanol or methanol under stirring condition. This sol formulation is applied by dip coating process on zinc or zinc alloy coated steel substrate to give a clear transparent sol-gel coating film. The coated steel substrate is then oven dried at 60 to 70 degree centigrade for 20 to 30 minutes.

EXAMPLE 2

A mixture of 30 ml of Trimethoxymethylsilane (TMMS) and 12 ml of Tetraethyl orthosilicate (TEOS) combined in a beaker. Under vigorous stirring condition 16 gm of colloidal silica (sigma Aldrich product, ludox AM 30 colloidal silica 30 wt % suspension in water) was added. Thereafter, 1 ml of sodium vanadate solution was added in the above sol mixture. Acetic acid of 0.2 ml was added in the formulation within 20 second of colloidal silica addition.

After 30 minutes of continuous stirring, again 1 ml of sodium vanadate solution was added. The above solution was kept under stirring condition for about 20 hours and in this time period the two phases disappear to become a single phase sol formulation. This sol formulation was applied by dip coating process on zinc or zinc alloy coated steel substrate. This gave a clear transparent sol-gel coating film. The coated substrate was then dried in oven at 60 to 100° C. for 20 to 30 minutes.

If required the above sol formulation viscosity may be reduced by adding methanol or ethanol under stirring condition. This sol formulation was applied by dip coating process on zinc or zinc alloy coated steel substrate. This gave a clear transparent sol-gel coating film. The coated substrate was then dried in oven at 60° to 100° C. for 20 to 30 minutes.

The invention as herein described and illustrated should not be read and construed in a restrictive manner as various adaptations, alterations and modifications are possible within the scope and limit of the invention as defined in the encompassed appended claims.

We claim:

1. A method of preparing anti-corrosive hybrid sol-gel film coating on zinc or zinc alloy coated metallic substrates comprising the steps of preparing a mixture of sol-gel from hydrolisable silicon alkoxides, sodium vanadate solution combined with colloidal silica in a beaker and vigorously stirred; adding within 20 seconds of two separated phase formation between silicon alkoxides and colloidal silica, acetic acid or dilute nitric acid as a catalizer to initiate hydrolysis reaction of silicon alkoxides and condensation reaction in the sol gel composition, continuously stirring the mixture for about 24 hours to form a single phase solution, applying the solution on cleaned zinc or zinc alloy coated metal substrates to form a transparent sol-gel coating film and drying the coated substrates at 50° to 200° C. for 10 to 60 minutes.

2. A method as claimed in claim 1, wherein the silicon alkoxides are trimethoxymethylsilane (TMMS) and tetraethyl orthosilicate (TEOS), methyltriethoxysilane (MTES), ethyltriethoxysilane (ETES) and tetramethoxysilane (TMOS) when added singular or in combination.

3. A method as claimed in claim 1, wherein colloidal silica is a nano particle silica sol of surface area 200-300 meter square per gram and pH of the colloidal silica is in range of 8.5 -10.

4. A method as claimed in claim 1, wherein the sodium vanadate solution is prepared by adding a predetermined amount of sodium vanadate compound in a predetermined amount of distilled water, adding a few drops of nitric acid and vigorously stirring the contents at 50° C. continuously until the sodium vanadate is completely dissolved in water to form a light yellow colour sodium vanadate solution, the said solution on cooling to ambient temperature when added to sol-gel composition enhance corrosion resistance property of the composition.

5. A method as claimed in claim 1, wherein the said sol gel film coating solution is prepared by mixing solutions of TMMS and TEOS, combined with colloidal silica and vigorously stirred, adding within 20 seconds of two separate phase formation in the mixture of solutions acetic acid or dilute nitric acid as a catalyzer to initiate hydrolysis reaction, continuously stirring the mixture for about 24 hours to form a single phase solution, applying the resulted solution on zinc or zinc alloy coated metal substrates and drying the substrate at 70° C.

6. A method as claimed in claim 1, wherein the ratio of total Si atoms in silicon alkoxide to total Si atoms in the colloidal silica is in the ratio of 5:1 and 1:1.

7. A method as claimed in claim 1, wherein the metallic surface is zinc, zinc alloy coated steel, the zinc and zinc alloy steel being galvanized and galvannealed material respectively.

8. A method as claimed in claim 1, wherein the sol-gel coating is applied on zinc or zinc alloy steel surface and subsequently dried at 50 to 200° C. for 10 to 60 minutes, wherein the thickness of the resulting sol-gel film is maintained between 1 μm to 10 μm.

* * * * *